US010620911B2

United States Patent
Ashoori et al.

(10) Patent No.: US 10,620,911 B2
(45) Date of Patent: *Apr. 14, 2020

(54) MACHINE LEARNING TO IDENTIFY A USER INTERFACE TRACE

(71) Applicant: International Business Machines Corporation, Armonk, NY (US)

(72) Inventors: Maryam Ashoori, Yorktown Heights, NY (US); Justin D. Weisz, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 125 days.

This patent is subject to a terminal disclaimer.

(21) Appl. No.: 15/793,359

(22) Filed: Oct. 25, 2017

(65) Prior Publication Data

US 2019/0121611 A1  Apr. 25, 2019

(51) Int. Cl.
*G06F 3/16* (2006.01)
*G10L 15/16* (2006.01)
*G06F 3/01* (2006.01)
*G06N 20/00* (2019.01)
(Continued)

(52) U.S. Cl.
CPC ............ *G06F 3/167* (2013.01); *G06F 3/01* (2013.01); *G06F 17/27* (2013.01); *G06N 20/00* (2019.01); *G10L 15/16* (2013.01); *G10L 15/26* (2013.01)

(58) Field of Classification Search
USPC .......................... 704/246, 247, 251, 252, 275
See application file for complete search history.

(56) References Cited

U.S. PATENT DOCUMENTS

| 8,577,422 | B1* | 11/2013 | Ledet ................ G06F 3/011 455/566 |
| 8,892,424 | B2 | 11/2014 | Harada et al. |
| 9,105,042 | B2 | 8/2015 | Sylves |

(Continued)

FOREIGN PATENT DOCUMENTS

| WO | 2016094335 | 6/2016 |
| WO | 2017091883 | 6/2017 |

OTHER PUBLICATIONS

Ngo et al., Identifying User Intents in Vietnamese Spoken Language Commands and Its Application in Smart Mobile Voice Interaction, Asian Conference on Intelligent Information and Database Systems 2016, vol. 9621, Dec. 2016, pp. 190-201, Springer Berlin Heidelberg.

(Continued)

*Primary Examiner* — Leonard Saint Cyr
(74) *Attorney, Agent, or Firm* — Lieberman & Brandsdorfer, LLC

(57) ABSTRACT

A system, computer program product, and method are provided for use with an intelligent computer platform to convert audio data intents to one or more physical actions. The aspect of converting audio data intent includes receiving audio, converting the audio to text, parsing the text into segments, identifying a physical action and associated application that are proximal in time to the received audio. A corpus is searched for evidence of the text to identify evidence of a physical user interface trace with a select application. An outcome is generated from the evidence. The outcome includes an instruction to invoke a user interface trace with the select application as a representation of the received audio.

17 Claims, 13 Drawing Sheets

(51) Int. Cl.
*G06F 17/27* (2006.01)
*G10L 15/26* (2006.01)

(56) References Cited

U.S. PATENT DOCUMENTS

| | | |
|---|---|---|
| 9,508,339 B2 | 11/2016 | Kannan et al. |
| 9,733,894 B2 | 8/2017 | Brown et al. |
| 2006/0047386 A1* | 3/2006 | Kanevsky .............. B60K 35/00 701/36 |
| 2014/0095162 A1 | 4/2014 | Kanevsky et al. |
| 2014/0207453 A1* | 7/2014 | Shin ....................... G06F 17/24 704/235 |
| 2014/0250120 A1* | 9/2014 | Mei ....................... G06F 3/0488 707/736 |
| 2015/0379983 A1 | 12/2015 | Siohan et al. |
| 2017/0068656 A1 | 3/2017 | Braga et al. |
| 2017/0069310 A1 | 3/2017 | Hakkani-Tur et al. |
| 2017/0069325 A1 | 3/2017 | Braga et al. |
| 2017/0221482 A1 | 8/2017 | Baldwin et al. |

OTHER PUBLICATIONS

De Bayser et al., A Hybrid Architecture for Multi-Party Conversational Systems, Cornelly Unviersity Library, arXiv:1705.01214v2, May 8, 2017, pp. 1-40.

Chen, Unsupervised learning and Modeling of Knowledge and Intent for Spoken Dialogue Systems, Carnegie Mellon University, Dec. 2015, pp. 1-193.

Yang et al., Crowdsourcing for Spoken Dialog Systems Evaluation, Crowdsourcing for Speech Processing: Applications to Data Collection, Transcription and Assessment, Chapter 8, Mar. 8, 2013, pp. 217-240.

Amazon.com, Alexa Voice Service, web-page, Sep. 5, 2015, https://developer.amazon.com/alexa-voice-service, pp. 1-7.

IBM.com, Watson Speech to Text, Nov. 28, 2016, https://www.ibm.com/watson/services/speech-to-text/, pp. 1-8.

List of IBM Patents or Applications Treated as Related, Oct. 2017.

\* cited by examiner

MACHINE LEARNING TO IDENTIFY A USER INTERFACE TRACE

BACKGROUND

The present embodiment(s) relate to natural language processing. More specifically, the embodiment(s) relate to an artificial intelligence platform for executing a user interface trace for an identified application.

In the field of artificially intelligent computer systems, natural language systems (such as the IBM Watson™ artificially intelligent computer system and other natural language question answering systems) process natural language based on knowledge acquired by the system. To process natural language, the system may be trained with data derived from a database or corpus of knowledge, but the resulting outcome can be incorrect or inaccurate for a variety of reasons relating to the peculiarities of language constructs and human reasoning.

Voice activated artificial intelligence is a platform that employs voice recognition to translate speed, and artificial intelligence to understand intent. A voice user interface (VUI) enables interaction with a computer possible through a voice/speech platform to initiate a service or process, also referred to herein as hands free. More specifically, hands free may be used in a variety of platforms, such as when operating a vehicle, and typically communicates with hardware that sends and receives voice or other data as digital packets. Hands free functionality is known to be used for dialing telephone numbers, and more recently for accessing information on a computer network. In each of these scenarios the use of hands free is employed in an active mode, where the device is in an activate state configured to receive a voice command. The active hands free functionality enables people to use voice to activate a defined function.

The artificial intelligence (AI) component of the VUI collects data for the underlying product. The collected data is synced with the application, and one or more recommendations for use of the underlying product may be generated as a recommendation for use of the product. The recommendation(s) are based on current and past use of the underlying product. Accordingly, existing solutions for VUI in combination with AI employ a voice activated platform for activating a product and collecting data or utilizing product collected data for enhanced use of the product.

SUMMARY

The embodiments include a system, computer program product, and method for deciphering a phrase presented in audio content.

In one aspect, a system is provided for use with an intelligent computer platform. A processing unit is operatively coupled to memory and is in communication with an artificial intelligence platform. A knowledge engine tool, in communication with the processing unit, is activated by the artificial intelligence platform and employed to decipher a phrase. More specifically, verbal content is received from an audio stream across a communication channel. The audio data is converted into text, and one or more segments in the text are identified. A corpus is searched for evidence of the text and to identify evidence of a physical user interface trace with a select application. From the corpus search, a select physical user interface trace is identified, and an outcome is generated. The outcome is the physical action identified in the corpus, with the outcome including an instruction to invoke a user interface trace with the select application as a representation of the received audio data.

In another aspect, a computer program device is provided to convert verbal content into a physical action. The computer program product utilizes a computer readable storage device with embodied executable program code executable by a processing unit. The program code captures verbal content verbal content received from an audio stream across a communication channel. Program code converts the verbal content into text, and identifies one or more segments in the text. The program code searches a corpus for evidence of the text and to identify evidence of a physical user interface trace with a select application. From the corpus search, a select physical user interface trace is identified, and an outcome is generated. The outcome is the physical action identified in the corpus, with the outcome including a program code instruction to invoke a user interface trace with the select application as a representation of the received audio data.

In yet another aspect, a method is provided for capturing verbal content from an audio stream across a communication channel, converting the content to a text representation, and identifying one or more segments in the text. A corpus is searched for evidence of the text and for identifying evidence of a physical user interface trace with a select application. From the corpus search, a select physical user interface trace is identified, and an outcome is generated. The outcome is the physical action identified in the corpus, with the outcome including invoking a user interface trace with the select application as a representation of the received audio data.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings reference herein forms a part of the specification. Features shown in the drawings are meant as illustrative of only some embodiments, and not of all embodiments, unless otherwise explicitly indicated.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Figure 1:
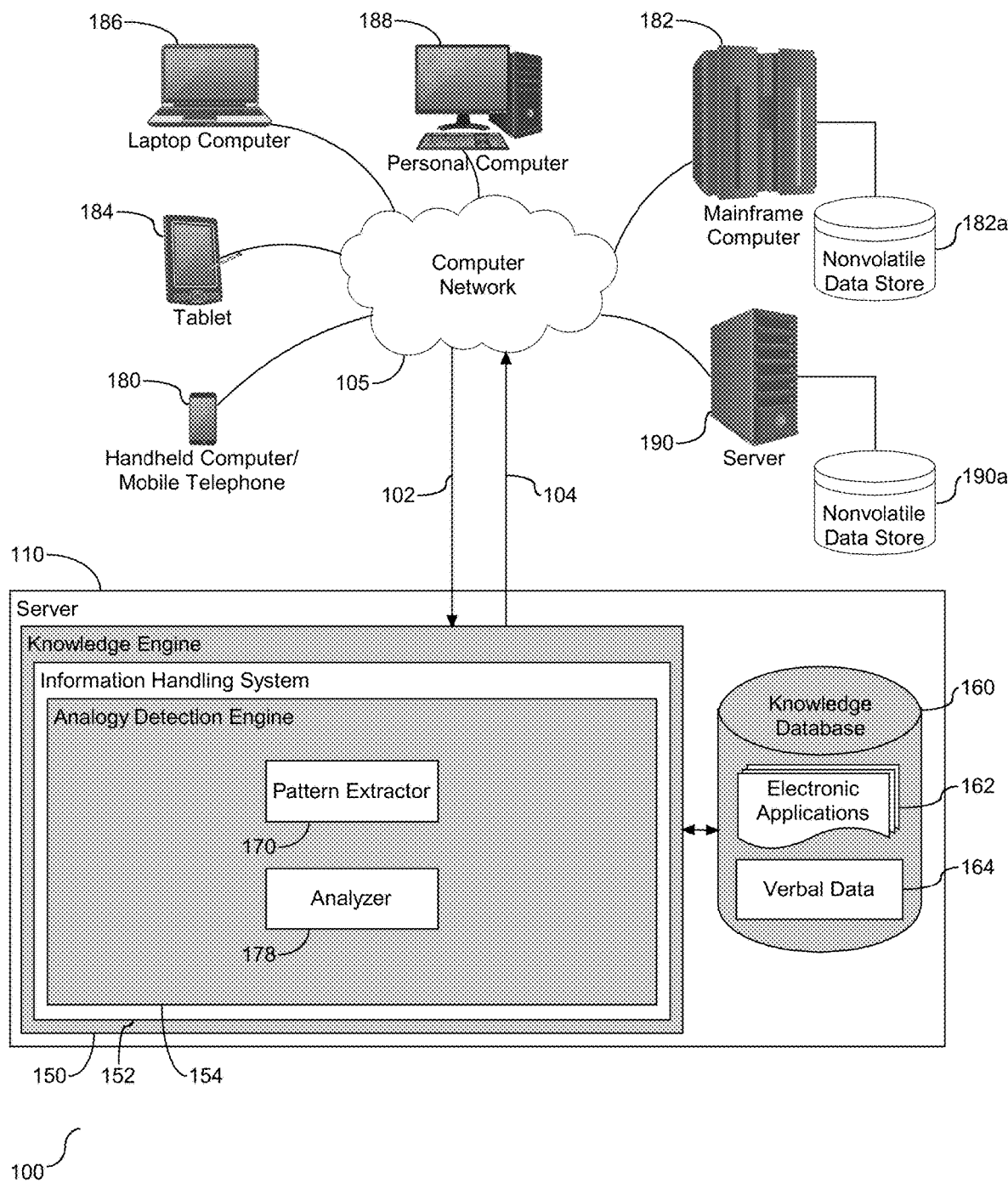
FIG. 1 depicts a system diagram illustrating a schematic diagram of a natural language process system.

Referring to FIG. 1, a schematic diagram of a natural language process system (100) is depicted. As shown, a server (110) is provided in communication with a plurality of computing devices (180), (182), (184), (186), and (188) across a network connection (105). The server (110) is configured with a processing unit in communication with memory across a bus. The server (110) is shown with a knowledge engine (150) for natural language processing over the network (105) from one or more computing devices (180), (182), (184), (186) and (188). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) may enable pattern recognition and resolution for one or more content users. Other embodiments of the server (110) may be used with components, systems, sub-systems, and/or devices other than those that are depicted herein.

The knowledge engine (150) may be configured to receive input from various sources. For example, knowledge engine (150) may receive input in the form of user interface trace(s) with electronic components (162), semantic data (164), or other data, content users, and other possible sources of input from the network (105) or one or more knowledge bases of corpus (160). The various computing devices (180), (182), (184), (186), and (188) in communication with the network (105) demonstrate access points for verbal content and user interface traces. Some of the computing devices may include devices for a database storing the corpus of data as a body of information used by the knowledge engine (150) to transmit and execute one or more user interface traces (104). The network (105) may include local network connections and remote connections in various embodiments, such that the knowledge engine (150) may operate in environments of any size, including local and global, e.g. the Internet. Additionally, the knowledge engine (150) serves as a front-end system that can make available a variety of knowledge extracted from captured verbal content and one or more associated user interface traces. In this manner, some processes populate the knowledge engine (150) with the knowledge engine (150) also including input interfaces to receive requests and respond accordingly.

As shown, content may be in the form of applications as related to verbal content and captured user interface traces. The knowledge base (160), also referred to herein as the corpus, stores one or more captured verbal phrases (164) and electronic data (162), including active applications, activated applications, and corresponding captured user interface traces. The verbal data (164) may include any structured and unstructured text representation of verbal content for use by the knowledge engine (150). Content users may access the knowledge engine (150) via a network connection or an internet connection to the network (105), and may submit natural language input to the knowledge engine (150) that may effectively determine a user interface trace present in the corpus by searching content in the corpus of data. As further described below, when a process evaluates captured speech and captured user interface trace data, e.g. physical interaction with an application, the process can use a variety of conventions to query a correlation from the knowledge engine (150). The verbal data (164) is also referred as a semantic content, which is content that interprets an expression, such as by using Natural Language (NL) processing. In one embodiment, the process sends verbal content (102), e.g. natural language text, to the knowledge engine (150), so that the content (102) may be converted to a text representation and the knowledge engine (150) may identify one or more keywords in the text representation, identify an association between the identified keyword(s) and a captured user interface trace, and provide a response in the form of one or more affirmative instructions to execute a user interface trace (104).

In some illustrative embodiments, server (110) may be the IBM Watson™ system available from International Business Machines Corporation of Armonk, N.Y., which is augmented with the mechanisms of the illustrative embodiments described hereafter. The IBM Watson™ knowledge manager system may receive input content (102) which it then converts to a text representation to identify one or more keywords in the text representation (102) that in turn are then applied to the corpus of data stored in the knowledge base (160). Based on application of the input content (102) to the corpus of data, a set of candidate outcomes are generated by looking across the corpus of data for portions of the corpus of data that have potential for containing a matching or correlating physical action to the submitted content (102).

In particular, received content (102) may be processed by the IBM Watson™ server (110) which performs analysis on the language of the input content (102) and the keyword(s) used in each of the portions of the corpus of data found during application of the content using a variety of reasoning algorithms. There may be multiple reasoning algorithms applied, each of which performs different analysis, e.g., comparisons, and generates a score. For example, one or more reasoning algorithms may look at the matching of terms and synonyms within the language of the input content (102) and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response (104) is inferred by the input content (102) based on the specific area of focus of that reasoning algorithm. Each resulting score is weighted against a statistical model. The statistical model captures how well the reasoning algorithm performed at establishing the inference between two similar passages for a particular domain during the training period of the IBM Watson™ system. The statistical model may be used to summarize a level of confidence that the IBM Watson™ system has regarding the evidence that the potential response (104), i.e., candidate affirmative instruction to execute a user interface trace, is inferred by the input content (102). This process may be repeated for each of the candidate outcomes (104) until the IBM Watson™ system (110) identifies candidate outcomes that surface as being significantly stronger than others and thus, generates a final interface activity (104), or ranked set of interface activities, for the input content (102).

To process natural language, the system (110) may include an information handling system (152) which uses a detection engine (154) to identify one or more keywords in the text representation of the input content (102). Though shown as being embodied in or integrated with the server (110), the information handling system (152) and/or detection engine (154) may be implemented in a separate computing system (e.g., 190) that is connected across the network (105) to the server (110). Wherever embodied, the detection engine (154) detects and identifies keywords in a text representation of input content.

In selected example embodiments, the detection engine (154) may include a pattern extractor (170) that is configured to apply NL processing to detect a correlation between text representation and one or more captured user interface traces, e.g. physical interaction(s). As described in more detail with reference to FIGS. 8-12, the pattern extractor (170) may perform a search of the corpus (160) for evidence of a pattern from one or more prior keywords and user interface trace(s) associations. The pattern extractor (170) may also be configured to apply one or more learning methods to match a detected keyword to known user interface traces to decide and categorize the verbal context and identified keyword(s) as a user interface trace.

As shown, the detection engine (154) includes an analyzer (178) which functions as an interface between the text representation of the capture verbal phrase(s) and the corpus (160). More specifically, the analyzer (178) searches the corpus (160) for evidence of a user interface trace. The evidence may include a single user interface trace or multiple user interface traces, such as a sequential pattern of two or more user interface traces. In one embodiment, the evidence may include a single application, or be expanded to two or more applications supported by the operating system. The analyzer (178) applies a score to each feature set according to its incidence in the corpus (160). An outcome (104) from the analyzer (178) is in the form of one or more user interface traces with one or more applications that matches or closely matches one or more keywords identified in the text representation of the captured verbal content.

More specifically, the outcome (104) is based on the scoring, and in one embodiment, associated ranking of a plurality of potential outcomes.

Types of information handling systems that can utilize system (110) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet, computer (184), laptop, or notebook, computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store (190a), and mainframe computer (182) utilizes nonvolatile data store (182a). The nonvolatile data store (182a) can be a component that is external to the various information handling systems or can be internal to one of the information handling systems. An illustrative example of an information handling system showing an exemplary processor and various components commonly accessed by the processor is shown and described in FIG. 2.

Figure 2:
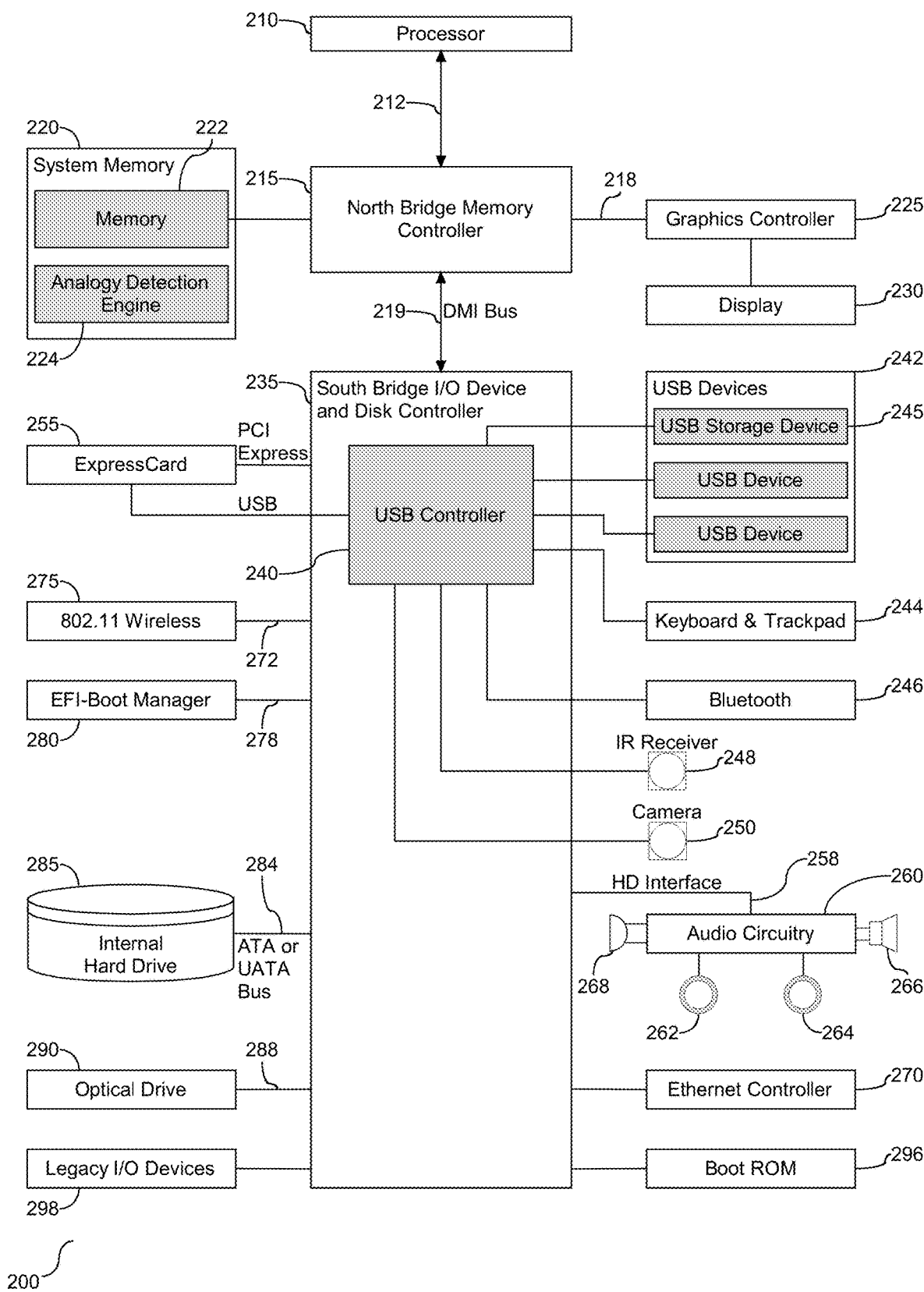
FIG. 2 depicts a block diagram of a processor and components of an information handling system such as those shown in FIG. 1.

Referring to FIG. 2, a block diagram (200) is provided illustrating information handling system. As shown, one or more processors (210) are coupled to processor interface bus (212), which connects processors (210) to Northbridge (215), which is also known as the Memory Controller Hub (MCH). Northbridge (215) connects to system memory (220) and provides a means for processor(s) (210) to access the system memory (220). In the system memory (220), a variety of programs may be stored in one or more memory devices (222), including an detection engine (224) which may be invoked to detect one or more user interface trace(s) by parsing or breaking a text representation of verbal content into one or more keywords and then use identified keyword(s) as input to the corpus to determine a pattern of prior user interface traces with one or more applications. Graphics controller (225) also connects to Northbridge (215). In one embodiment, PCI Express bus (218) connects Northbridge (215) to graphics controller (225). Graphics controller (225) connects to display device (230), such as a computer monitor.

Northbridge (215) and Southbridge (235) connect to each other using bus (219). In one embodiment, the bus is a Direct Media Interface (DMI) bus that transfers data at high speeds in each direction between Northbridge (215) and Southbridge (235). In another embodiment, a Peripheral Component Interconnect (PCI) bus connects the Northbridge and the Southbridge. Southbridge (235), also known as the I/O Controller Hub (ICH), is a chip that generally implements capabilities that operate at slower speeds than the capabilities provided by the Northbridge (215). Southbridge (235) typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM (296) and "legacy" I/O devices (298) (using a "super I/O" chip). The "legacy" I/O devices (298) can include, for example, serial and parallel ports, keyboard, mouse, and/or a floppy disk controller. Other components often included in Southbridge (235) include a Direct Memory Access (DMA) controller, a Programmable Interrupt Controller (PIC), and a storage device controller, which connects Southbridge (235) to nonvolatile storage device (285), such as a hard disk drive, using bus (284).

ExpressCard (255) is a slot that connects hot-pluggable devices to the information handling system. ExpressCard (255) supports both PCI Express and USB connectivity as it connects to Southbridge (235) using both the Universal Serial Bus (USB) the PCI Express bus. Southbridge (235) includes USB Controller (240) that provides USB connectivity to devices that connect to the USB. These devices include webcam (camera) (250), infrared (IR) receiver (248), keyboard and trackpad (244), and Bluetooth device (246), which provides for wireless personal area networks (PANs). USB Controller (240) also provides USB connectivity to other miscellaneous USB connected devices (242), such as a mouse, removable nonvolatile storage device (245), modems, network cards, ISDN connectors, fax, printers, USB hubs, and many other types of USB connected devices. While removable nonvolatile storage device (245) is shown as a USB-connected device, removable nonvolatile storage device (245) could be connected using a different interface, such as a Firewire interface, etc.

Wireless Local Area Network (LAN) device (275) connects to Southbridge (235) via the PCI or PCI Express bus (272). LAN device (275) typically implements one of the IEEE 802.11 standards for over-the-air modulation techniques to wireless communicate between information handling system (200) and another computer system or device. Extensible Firmware Interface (EFI) manager (280) connects to Southbridge (235) via Serial Peripheral Interface (SPI) bus (278) and is used to interface between an operating system and platform firmware. Optical storage device (290) connects to Southbridge (235) using Serial ATA (SATA) bus (288). Serial ATA adapters and devices communicate over a high-speed serial link. The Serial ATA bus also connects Southbridge (235) to other forms of storage devices, such as hard disk drives. Audio circuitry (260), such as a sound card, connects to Southbridge (235) via bus (258). Audio circuitry (260) also provides functionality such as audio line-in and optical digital audio in port (262), optical digital output and headphone jack (264), internal speakers (266), and internal microphone (268). Ethernet controller (270) connects to Southbridge (235) using a bus, such as the PCI or PCI Express bus. Ethernet controller (270) connects information handling system (200) to a computer network, such as a Local Area Network (LAN), the Internet, and other public and private computer networks.

While FIG. 2 shows one information handling system (200), an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
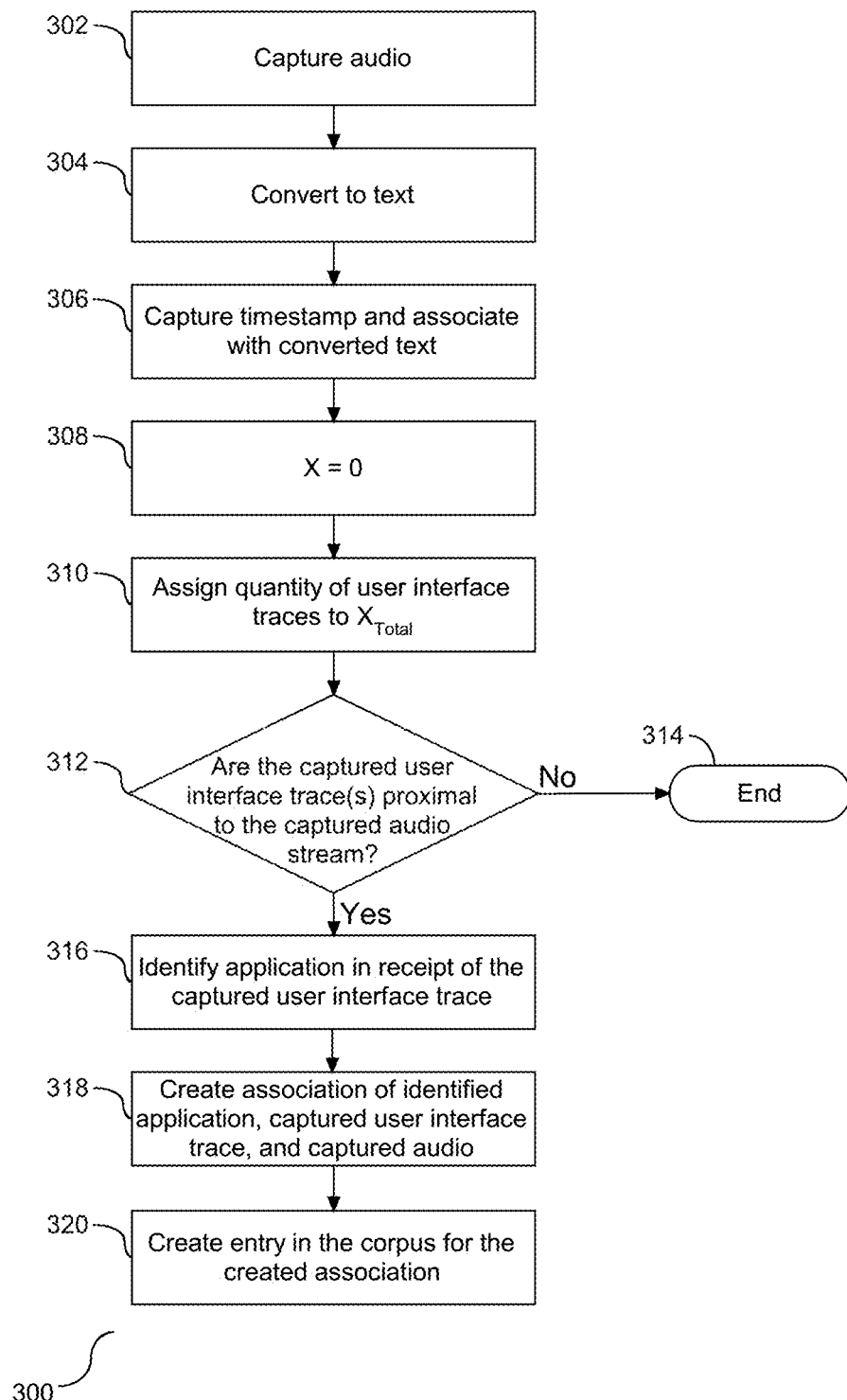
FIG. 3 depicts a flow chart illustrating a process for gathering data that may selectively populate the corpus.

To provide additional details for an improved understanding of selected embodiments of the present disclosure, reference is now made to FIG. 3 which illustrates a process for identifying audio and keywords therein, and associated user interface traces. Referring to FIG. 3, a flow chart (300) is provided illustrating a process for gathering data that may selectively populate the corpus. Speech to text services are known and recognized in the art and one or more of these services or applications are consulted and utilized to identify keywords in received text. As shown, a sample of audio is captured (302) and converted into text (304). A timestamp associated with the gathered audio is collected and associated with the converted text (306). In one embodiment, a microphone sampling takes place at fixed intervals. A counting variable, X, associated with capturing user interface traces is initialized (308). Accordingly, the process of capturing audio samples includes identification of an associated timestamp and one or more user interface traces.

The process of associating a user interface trace with captured audio is based on a few principles, including evaluating the captured audio with prior associations, leveraging the time stamp, identification of one or more keywords in the captured audio, and a combination of these principles. Following step (308), the quantity of user interface traces that took place or are otherwise associated with the captured audio is assigned to the variable $X_{Total}$ (310). It is understood that in one embodiment, there may not be any user interface traces associated with the captured audio. Similarly, in one embodiment, there may be a plurality of user interface traces that are associated with the captured audio. It is understood that there is a time proximity that determines the relationship of the captured audio stream to the captured user interface traces. The time proximity may be a fixed interval, or in one embodiment may be configurable. Following step (310), it is determined if the captured user interface trace(s) is within the defined time proximity to the captured audio stream (312). A negative response to the determination at step (312) concludes the audio stream evaluation (314). However, a positive response to the determination at step (312) is followed by identifying the application in receipt of the captured user interface trace(s) (316) and creating an association of the identified application, the captured user interface trace(s), and the captured audio (318). An entry is created in the corpus for the data in the created association (320). Accordingly, as shown, in select circumstances, an association between the captured audio and one or more corresponding user interface traces is created and populated to the corpus.

It is understood that the user interface trace(s) may include one or more traces captured within a window prior to or following the audio capture or gathering. In other words, user interface interactions with the associated computer platform are captured to cover N seconds before and/or after the captured or gathered audio sample. Similarly, in one embodiment, the N seconds may be a fixed time interval, or a configurable time interval. For example, in one embodiment, the N second time interval may be dynamic and responsive to a pause in the user interface interactions with the associated computer platform. The identified user interface traces include traces of behavior in interaction with a subject application, and in one embodiment includes collection of traces of behavior within the subject application and surrounding context of application usage. Examples of the traces of behavior include, but are not limited to: which screen was viewed during the gathering, where on an associated display a trace was detect, which user interface elements were activated, any characters received in an associated keyboard entry, telephone sensor data, e.g. accelerometer, gyroscope, and magnetometer readings, gps location, etc. Accordingly, as shown herein, computer platform interface data is gathered for one or more collected audio samples.

Figure 4:
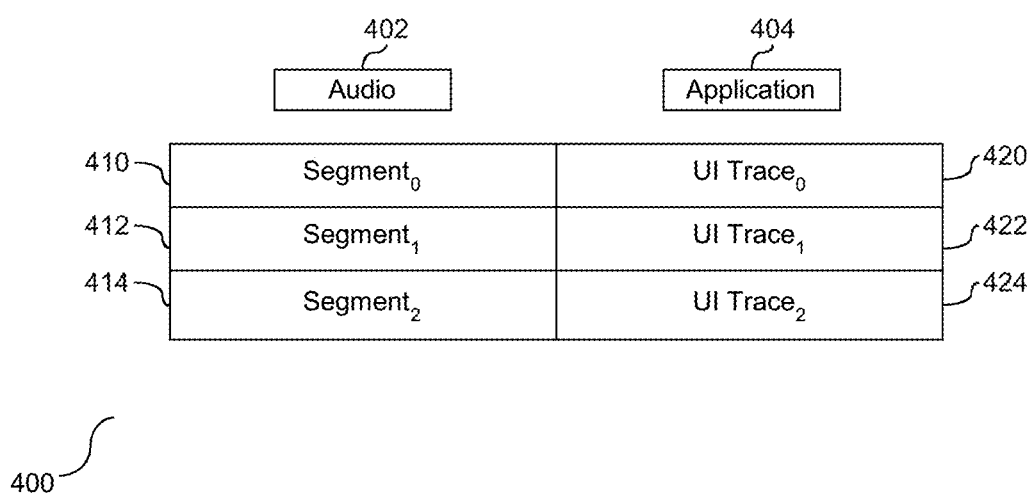
FIG. 4 depicts a block diagram illustrating segments identified in prior text representations of verbal content and their associated user interface traces for an identified application.

Referring to FIG. 4, a block diagram (400) is provided to illustrate segments identified in prior text representations of verbal content and their associated user interface traces for an identified application. It is understood that the relationship between a keyword and a user interface trace may differentiate based on the application. For example, the same keyword for two different applications may yield or be associated with two different user interface traces. Although, in select embodiments the same keyword for two different applications may yield or be associated with the same user interface trace(s). The relationship is gathered by use of the application and identification of prior user interface traces in select conditions. Audio (402) is captured and converted to a text representation from a text parsing tool. An active application that is associated with the captured audio is identified (404). In one embodiment, the application is referred to as the subject application. Examples of relationships between captured audio and user interface traces for the subject application are shown. As shown in this example, the captured audio is parsed into components, referred to herein as segment, and in one embodiment may be referred to as keywords. For example, in one embodiment, the segment is a phrase within the captured audio with a corresponding user interface trace. As shown, $segment_0$ (410) is shown with user interface $trace_0$ (420); $segment_1$ (412) is shown with user interface $trace_1$ (422); and $segment_2$ (414) is shown with user interface $trace_2$ (424). The quantity of audio segments and user interface traces is an example and should not be considered limiting. The user interface traces (420)-(424) may each represent a single interface trace or multiple interface traces, such as a sequential or ordered set of traces. In one embodiment, the physical interface trace(s) represent a captured physical interface associated with the application (404) proximal in time to the captured audio (402). Resolution of the captured audio (402) and the identified application (404) is based on each segment as previously identified to be associated with a physical interaction in the identified application (404). In one embodiment, each segment and physical interaction relationship for the select application is populated into the knowledge base (160), and becomes part of the corpus to facilitate resolution of natural language input to be received. Accordingly, the resolutions of audio segments and physical interface traces shown herein are based upon captured verbal phrases and physical interactions.

Figure 5:
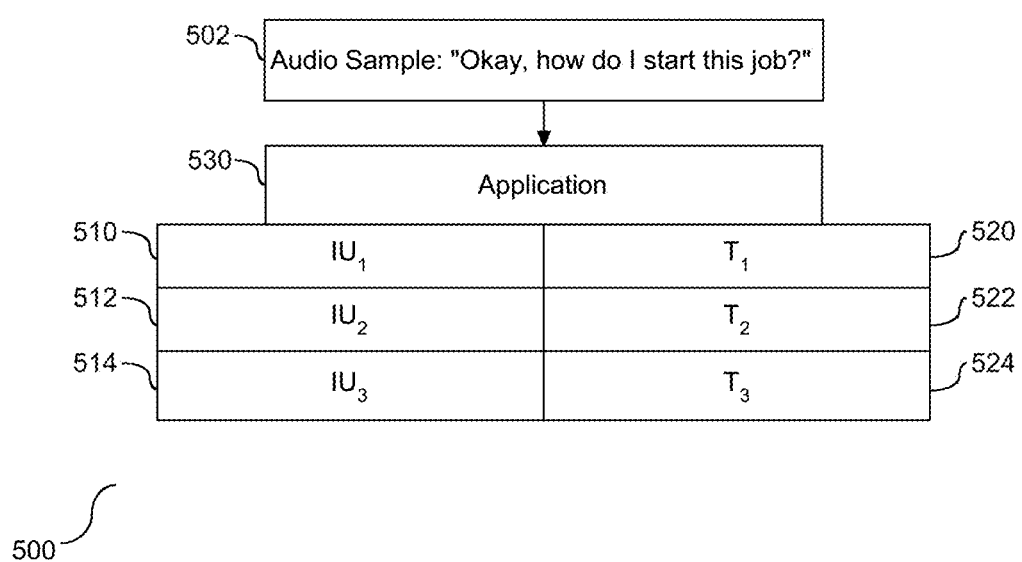
FIG. 5 depicts a block diagram illustrating an example of the data gathered from an audio sample.

Referring to FIG. 5, a block diagram (500) is provided illustrating an example of the data gathered from an audio sample. The audio sample is shown herein as "okay, how do I start this job" (502). In one embodiment, the audio sample shown as (502) is a text representation of the received audio sample. In this example, three user interface traces (510), (512), and (514) are show being associated with the audio sample (502), together with identification of an application (530) in receipt of the user interface traces. For the captured or identified user interface traces, there is an associated time stamp. Specifically, user interface $trace_0$ (510) is shown with timestamp $T_0$ (520), user interface $trace_1$ (512) is shown with timestamp $T_1$ (522), and user interface $trace_2$ (514) is shown with timestamp $T_2$ (524). Accordingly, the application, interface traces, and timestamps are gathered from the associated computing platform.

Figure 6:
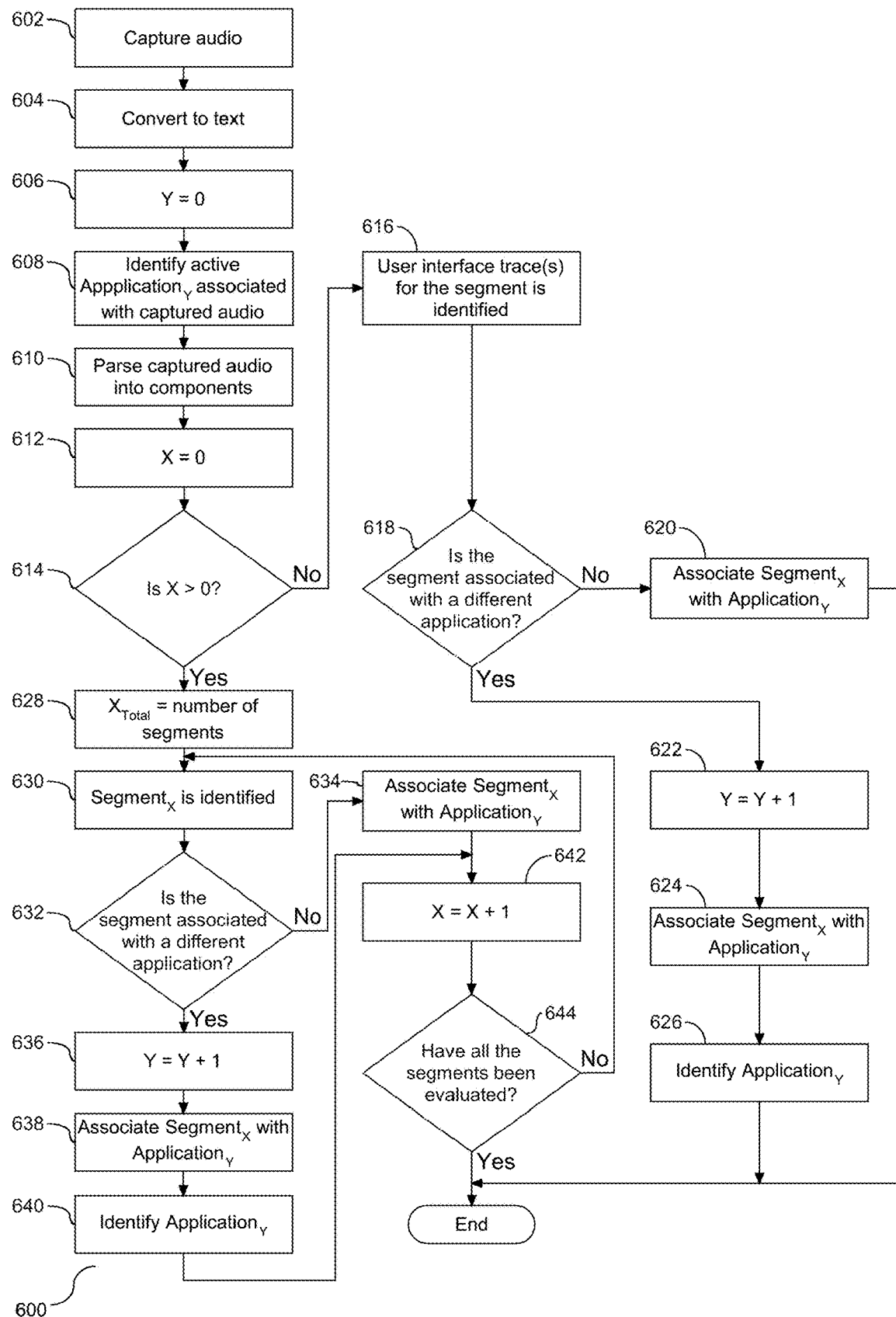
FIG. 6 depicts a flow chart illustrating user interface trace gathering demonstrated on an inter-application environment.

As shown in FIGS. 4 and 5, the user interface trace identification is demonstrated on an intra-application environment. However, it is understood that an operating system may support multiple applications. Referring to FIG. 6, a flow chart (600) is provided illustrating user interface trace gathering demonstrated on an inter-application environment. Similar to FIG. 4, audio (602) is captured and converted to a text representation from a text parsing tool (604). An application counting variable Y is initialized (606), and an active application, $application_Y$, that is associated with the captured audio is identified (608). In one embodiment, the application is referred to as the subject application or the initial application. As shown in this example, the captured audio is parsed into components (610), referred to herein as segments, and in one embodiment may be referred to as keywords. For example, in one embodiment, the segment is a phrase within the captured audio with a corresponding user interface trace. A segment counting variable, X, is initialized (612). It is then determined if there is more than one segment in the captured audio (614). A negative response to the determination at step (614) is an indication that the captured audio has a single segment. The user interface trace(s) for the segment, $segment_X$, is identified (616). It is then determined if the segment is associated with a different application, e.g. an application that is different than the initial active application, (618). In one embodiment, the application identified aspect utilizes or leverages the operating system to cross application platforms to identify the application associated with the segment. A negative response to the determination at step (618) is followed by associating $segment_X$ with $application_Y$ (620), and a positive response to the determination at step (618) is followed by incrementing the application counting variable, Y, (622) and associating $segment_X$ with $application_Y$ (624). In addition, $application_Y$ is identified (626).

A positive response to the determination at step (614) is an indication that the captured audio has multiple segments. The quantity of segments is assigned to the variable $X_{Total}$ (628). Each of the segments is evaluated. Specifically, the user interface trace(s) for audio $segment_X$ is identified (630), and it is then determined if the segment is associated with a different application, e.g. an application that is different than the initial active application, (632). In one embodiment, the application identified aspect utilizes or leverages the operating system to cross application platforms to identify the application associated with the segment. A negative response to the determination at step (632) is followed by associating $segment_X$ with $application_Y$ (634), and a positive response to the determination at step (632) is followed by incrementing the application counting variable, Y, (636) and associating $segment_X$ with $application_Y$ (638). In addition, $application_Y$ is identified (640). The process and evaluation continues for each segment X. Following either step (634) or step (640), the segment counting variable is incremented (642), and it is then determined if all of the segments have been evaluated (644). A negative response to the determination at step (644) is followed by a return to step (630), whereas a positive response concludes the segment evaluation process. Accordingly, one or more user interface traces for a single audio segment may be associated with single application on an intra-application or an inter-application basis.

Following the evaluation of $segment_M$ it is determined if each of the identified segments in the captured audio has been evaluated (626). A positive response to the determination at step (626) ends the captured audio and user interface trace evaluation. However, a negative response to the determination at step (626) is followed by an increment of the segment counting variable (628) and a return to step (616). Accordingly, each segment of captured audio is evaluated to identify associated user interface traces on an inter-application basis.

Figure 7:
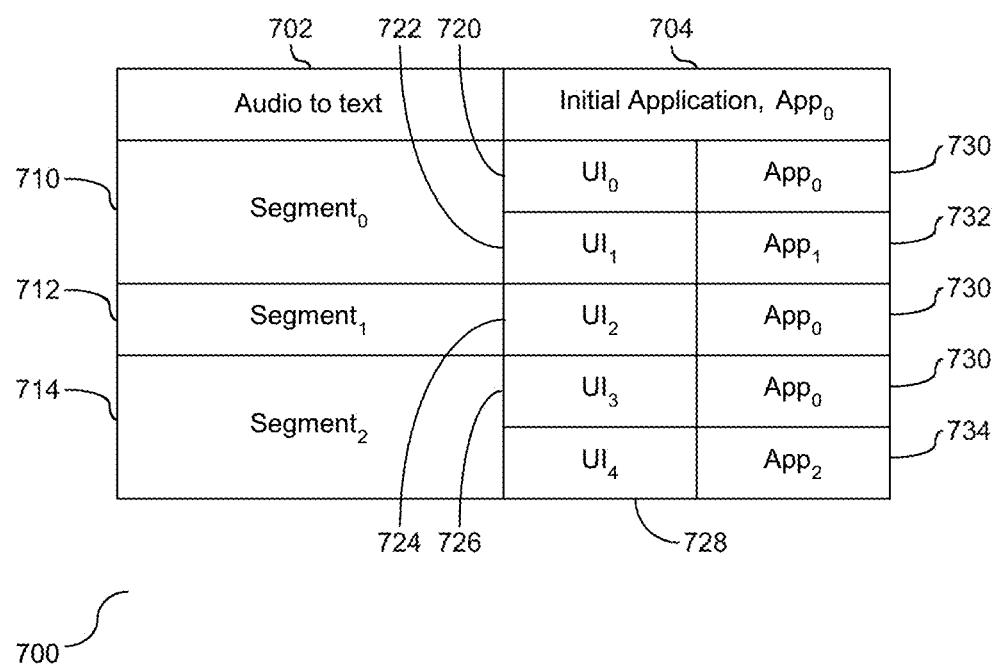
FIG. 7 depicts a block diagram illustrating a representation of audio segments, user interface traces and application associations.

Referring to FIG. 7, a block diagram (700) is provided showing a representation of audio segments, user interface traces and application associations. As shown, audio is identified as captured and converted to a text representation (702) together with the initial application associated with the identified audio (704). The text is shown herein to have multiple segments. Each segment may have one or more associated user interface traces, with each interface trace associated with application that may be the same as the initial application or may be different. In this example, there are three segments, shown herein as $segment_0$ (710), $segment_1$ (712), and $segment_2$ (714). $Segment_0$ (710) is shown associated with two user interface traces, $UI_0$ (720) and $UI_1$ (722) on an inter-application basis. Specifically, $UI_0$ (720) is shown associated with $application_0$ (730) and $UI_1$ (722) is shown associated with $application_1$ (732). $Segment_1$ (712) is shown with a single user interface trace, $UI_2$ (724) associated with the initial application, $application_0$ (730). $Segment_2$ (714) is shown with two user interface traces, $UI_3$ (726) associated with the initial application, $application_0$ (730) and $UI_4$ (728) associated with a third application, $application_2$ (734). Accordingly, the audio is captured and one or more segments, associated user interface traces, and applications are identified.

The identified user interface traces may each represent a single interface trace or multiple interface traces, such as a sequential or ordered set of traces. In one embodiment, the physical interface trace(s) represent a captured physical interface associated with one or more applications proximal in time to the captured audio. Each segment and associated user interface and application is populated into the knowledge base (160), and becomes part of the corpus to facilitate resolution of natural language input to be received. Accordingly, the resolutions of audio segments and physical interface traces shown herein are based upon captured verbal phrases and physical interactions.

The quantity of segments and user interface traces shown in FIG. 7 is an example and should not be considered limiting. The user interface traces may each represent a single interface trace or multiple interface traces, including, but not limited to a sequential or ordered set of traces. In one embodiment, the user interface trace(s) represent a captured physical interface associated either the same application or different applications, proximal in time to the captured speech. Resolution of the identified segments on an inter-application basis includes leveraging the operating system to identify both the application and the user interface trace that defines the selected activity. In one embodiment, a segment may be a keyword or grouping of keywords previously identified to be associated with a physical interaction in a select application. In one embodiment, each keyword and physical interaction relationship together with the identified application is populated into the knowledge base (160), and becomes part of the corpus to facilitate resolution of natural language input to be received. Accordingly, the resolutions of segments and physical interface traces may include identification and selection of an application in addition to the user interface trace(s) from other captured verbal phrases and physical interactions.

Figure 8:
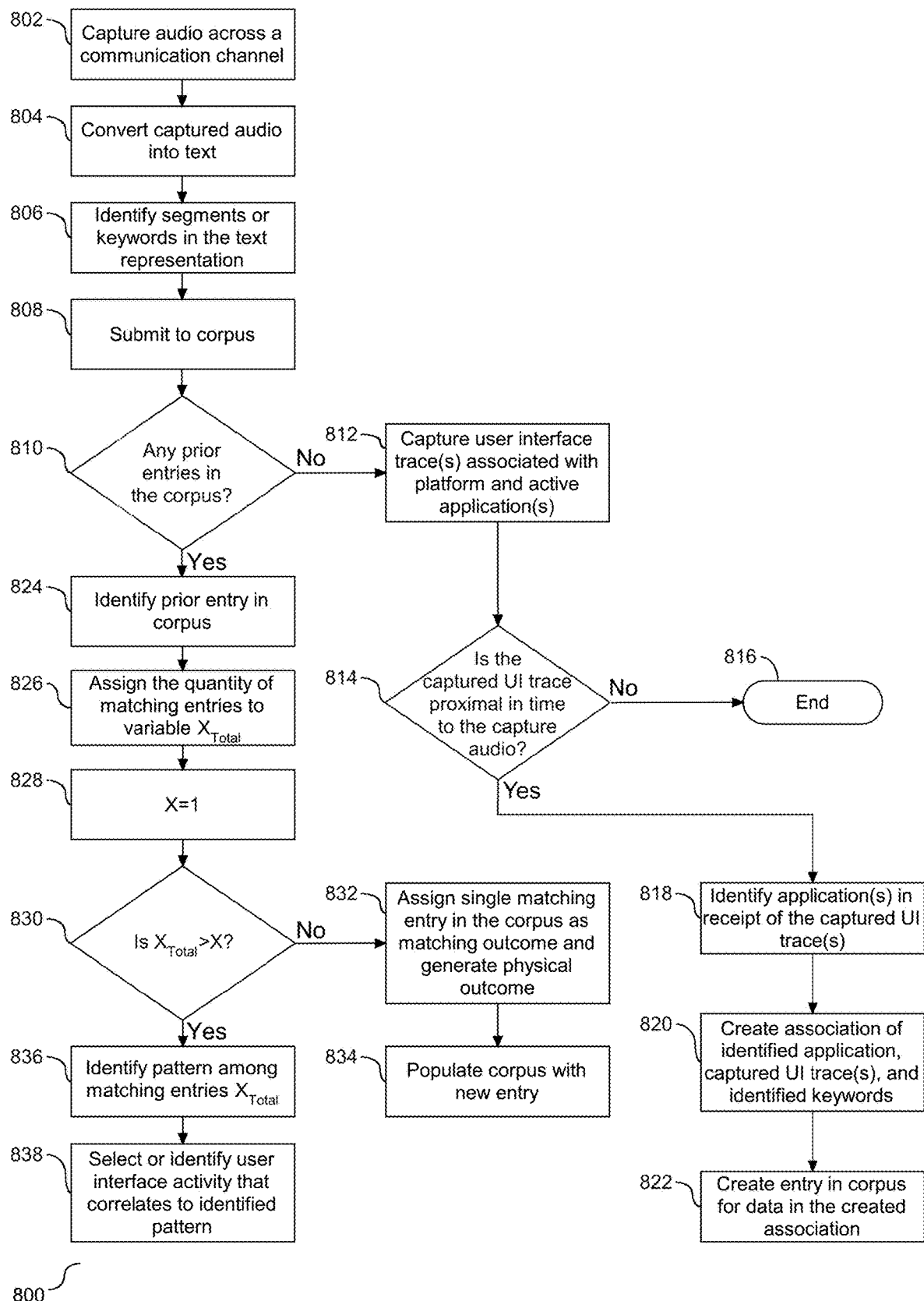
FIG. 8 depicts a flow chart illustrating a process for identifying and invoking a user interface trace.

FIGS. 3-7 are directed at the aspect of capturing audio content and associated user interface traces, and populating the corpus with the association. It is understood that audio content may be captured to utilize the corpus to invoke a physical user interface trace. Referring to FIG. 8, a flow chart (800) is provided illustrating a process for identifying and invoking a user interface trace. As shown, audio is captured from an audio stream across a communication channel (802). In one embodiment, an associated computing platform has an embedded microphone which captures the audio stream. Examples of the computing platform include, but are not limited to, a tablet and a mobile telecommunication device, e.g. smartphone. A voice to text tool converts the captured audio stream into a text representation (804). As described in FIG. 1, a tool is employed to identify one or more segments or keywords in the text representation (806). The identified segment(s) or keyword(s) are submitted to the corpus to search for evidence within the corpus of prior entries of the same or similar segment(s) or keyword(s) (808). It is then determined if there are any prior entries present in the corpus (810). A negative response to the determination at step (810) is followed by capturing one or more user interface traces associated with the computing platform and one or more active applications in receipt of the captured user interface traces (812). It is understood that there is a time proximity that determines the relationship of the captured audio stream to the captured user interface traces. The time proximity may be a fixed interval, or in one embodiment may be configurable. Following step (812), it is determined if the captured user interface trace(s) is within the defined time proximity to the captured audio stream (814). A negative response to the determination at step (814) concludes the audio stream evaluation (816). However, a positive response to the determination at step (814) is followed by identifying the application(s) in receipt of the captured user interface trace(s) (818) and creating an association of the identified application, the captured user interface trace(s) and the identified keyword(s) (820). An entry is created in the corpus for the data in the created association (822). Accordingly, as shown, in limited circumstances, the corpus is populated with the captured and identified data.

As shown at step (810), the corpus is searched to find prior user interface traces associated with the identified keyword(s). In limited circumstance, the corpus is populated with a new entry, as shown at step (822). However, a positive response to the determination at step (810) is an indication that the identified keyword(s) was associated with one or more user interface trace(s) in at least one prior circumstance, as evidenced by the entry in the corpus. The prior entry in the corpus is identified (824), including an identification of the application and the user interface trace(s). A single prior entry in the corpus identified at step (824) functions as evidence of a prior outcome. However, it is understood that as the corpus grows with entries, there may be a plurality of prior entries identified at step (824). As such, following step (824) the quantity of matching entries in the corpus is ascertained and assigned to the variable $X_{Total}$ (826). To process the matching entries, an entry counting variable is initialized (828). It is then determined if there are two or more matching entries in the corpus (830). A negative response to the determination at step (830) is followed by assigning the single matching entry in the corpus as a matching outcome (832). Specifically, a physical action associated with the identified user interface trace(s) is generated at step (832). In one embodiment, the physical action is a computer program instruction to invoke the identified user interface trace(s) with the identified application. In addition to generating the physical action, the corpus is populated with a new entry that includes the identified application, the user interface trace(s), and the segment(s) or keyword(s) that correspond to the generated action (834). Accordingly, as shown, a physical intent from the captured audio is converted into a physical manifestation that produces one or more actions in the selected application upon invocation of the intent and also populates the corpus with an entry as shown at step (834).

It is understood that as the corpus is populated with entries, there may be two or more matching entries in the corpus, as evidenced by a positive response to the determination at step (830). The goal for the plurality of entries is to ascertain a pattern among the entries. For example, in one embodiment, the user interface traces for each of the matching entries may be clustered or aggregated in order to determine a common set of user interface traces, e.g. pattern of user interface traces, among the entries. Examples of the user interface traces may include, but are not limited to, which display is being viewed, an area of the display that is in receipt of tap, which user interface elements were tapped, characters typed on a keypad entry, sensor data, such as accelerometer, gyroscope, magnometers, gps location data, etc. In the circumstance of two or more entries, it is understood that each entry may contain a subset of user interface traces. Based on an identified pattern (836), a user interface activity that correlates to the pattern is identified and/or selected (838). For example, in one embodiment at step (838) as new speech intent that invokes the identified sequence of user interface traces is created. Accordingly, evaluation of the audio stream accounts for a growing corpus and multiple matching entries.

Figure 9:
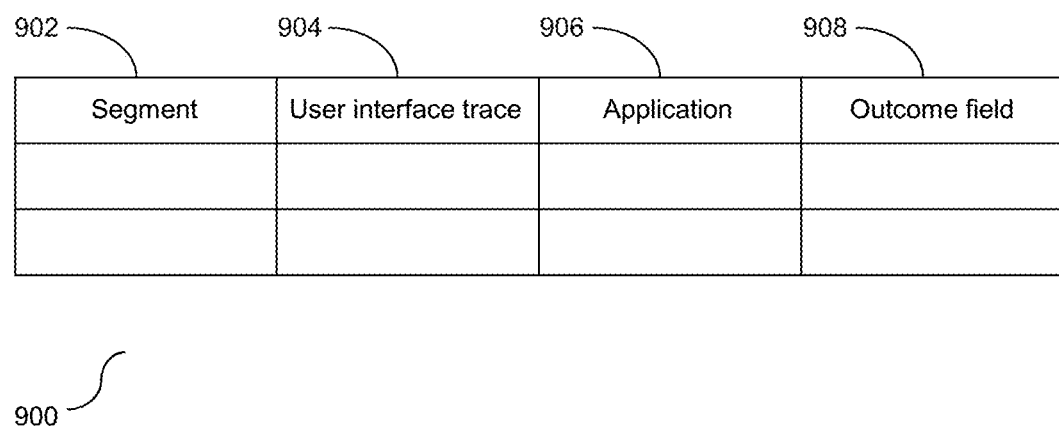
FIG. 9 depicts a chart illustrating an organization of entries in the corpus.

Referring to FIG. 9, a chart (900) is provided illustrating an organization of entries in the corpus. Each entry in the organization is directed at a specific application. In other words, the entries are application dependent. The organization shown herein is merely an example, and should not be considered limiting. In this example, the segment or keyword, herein after referred to as a segment, is identified (902) and associated with a user interface trace (904), and the application in receipt of the user interface trace (906). It is understood that the user interface trace or the keyword may have a different purpose and/or function in a different application. At the same time, it is understood that the detected user interface trace from a prior entry produced an action on the computer platform. For example, the detected trace may have placed an order for a product or a service, or selected an item from a menu within the application, etc. An outcome field (908) is represented in the organization to associate the received user interface trace with a physical action within the application. In one embodiment, an entry in the outcome field is in the form of a computer program instruction to invoke the functionality of the outcome as represented by the corresponding user interface trace. Accordingly, the organization shown herein is an example of an association of the keyword, the detected user interface trace, the subject application, and the functional outcome of the received user interface trace within the computer platform.

Figure 10:
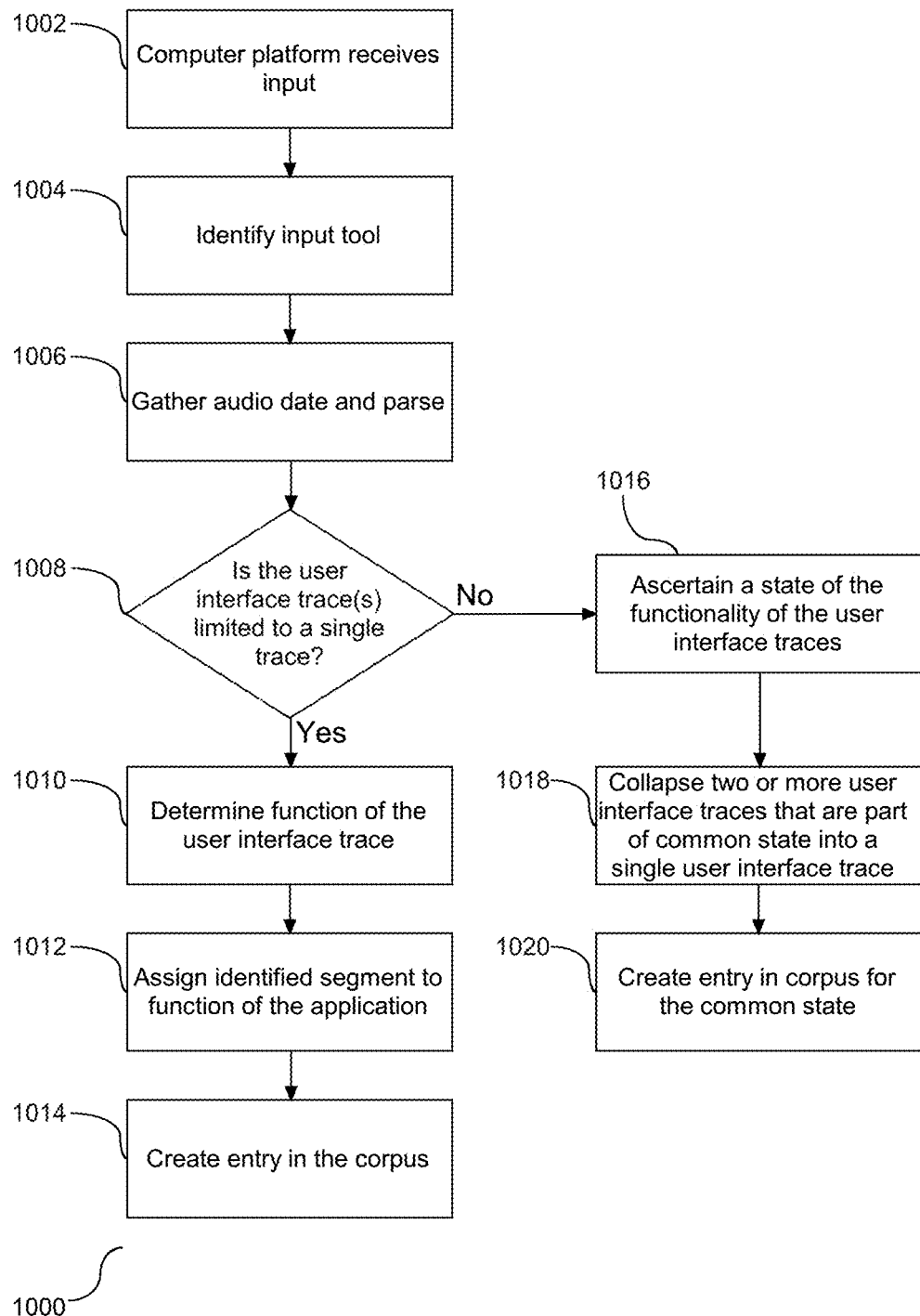
FIG. 10 depicts a flowchart illustrating reconciling of computer platform input with respect to the invoked function.
Figure 11:
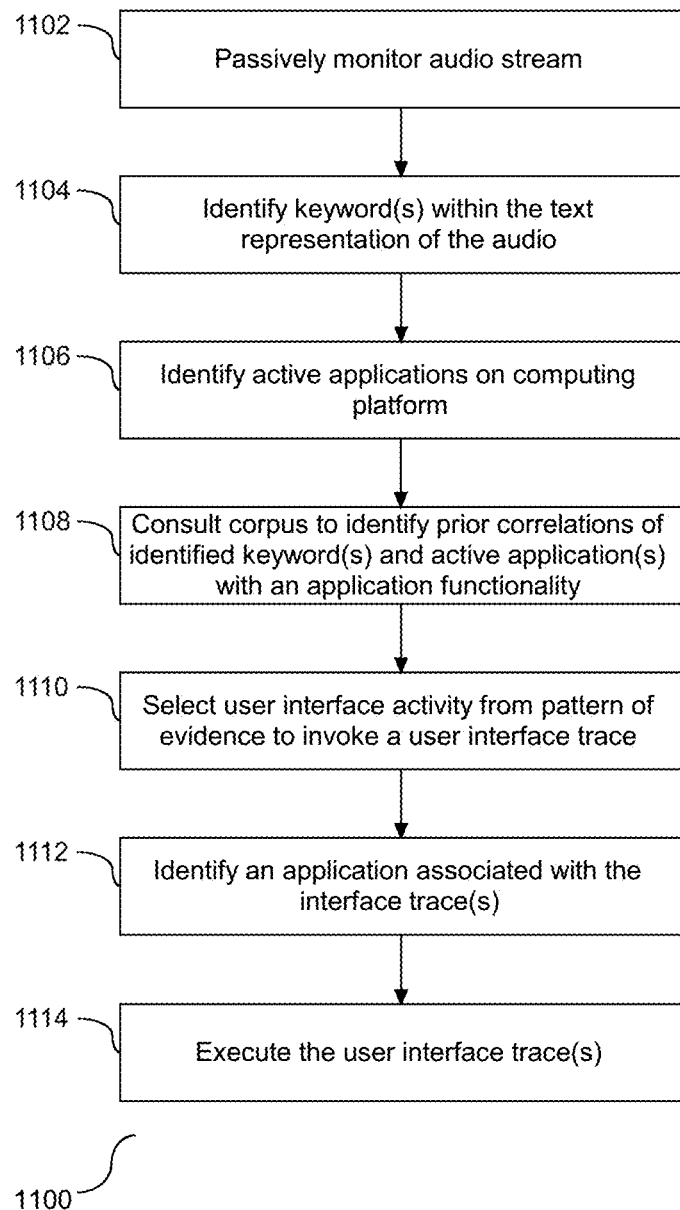
FIG. 11 depicts a flow chart illustrating crowdsource functionality for an audio stream.

As shown in FIG. 8, the corpus is leveraged to search for similar keywords and their associated user interface traces. However, it is understood that different user interface traces may yield or produce a common outcome. For example, a keyed entry to the computer platform and an entry received from an input device, such as a stylus, may be directed at the same application or the same function within an application. In other words, different or dissimilar entries to the computer platform may product an identical trace or an identical function. Referring to FIG. 10, a flow chart (1000) is provided to illustrate reconciling of computer platform input with respect to the invoked function. As shown and described in FIG. 8, input to a computer platform is processed and at the same time an entry in a corresponding corpus is created to facilitate processing of future actions. Input to the computer platform is received (1002), and the input tool is identified (1004). The input received at step (1002) may be limited to a single user interface trace, and in one embodiment may include a plurality of user interface traces. The input tool identified at step (1004) may be a keyed entry, a stylus, of direct interaction with the visual display. It is understood that the input invoked a local function. At the same time, an audio data that is close in time to the received input, is gathered and parsed for segment identification (1006), as shown and described in FIG. 8. It is then determined if the user interface trace(s) identified at step (1002) is limited to a single trace (1008). A positive response to the determination at step (1008) is followed by ascertaining the functionality of the user interface trace (1010), including the associated application and the functionality invoked on the computer platform. The identified segment is assigned to the functionality of the identified application (1012), and an associated entry is created in the corpus (1014). However, a negative response to the determination at step (1008) is followed by ascertaining a state of the functionality of the multiple user interface traces (1016). In one embodiment, the state may be a common pattern or function reached by the multiple user interface traces. Following step (1016), two or more interface traces that are a part of the common state or pattern are collapsed into a single user interface trace (1018) so that dissimilar user interface trace inputs produce identical traces. For example, a first trace for entering an address into a mapping application and a second trace for requesting directions to the entered address may be collapsed into a sequence that generates the second trace after input of data from the first trace. In one embodiment, the common pattern of function may be identified from dissimilar input(s) to the computer platform. Following step (1018), the identified common state, function, or pattern is associated with the identified keywords, pattern, and multiple user interface traces, and entered into the corpus (1020). Accordingly, as demonstrated multiple traces may be aggregated to a common user interface As shown and described, the processing of the audio stream is directed at generating an intended physical action with a computing platform. The corpus functions as a knowledge base of keywords, applications, and user interface traces. Referring to FIG. 11, a flow chart (1100) is provided to illustrate crowdsource functionality for an audio stream. Received audio is passively monitored (1102). As the audio is received, keywords, if any, within a text representation of the audio are identified (1104). At the same time, active applications on the associated computing platform are identified (1106). The corpus is consulted to identify any prior correlations of the identified keyword(s) and active application(s) with an associated application functionality (1108). In one embodiment, the consultation of the corpus is across multiple users of the identified application(s). Similarly, in one embodiment, the consultation of the corpus is an inter-application identification. The crowd sourcing shown herein enables the functionality to be on an application and keyword basis, and not limited to a specific use of the platform. Accordingly, the corpus may be expanded to identify patterns of prior uses across a plurality of users.

Following step (1108) and upon finding evidence present in the corpus, a user interface activity is selected from the pattern of evidence to invoke a user interface trace (1110). In one embodiment, the selection at step (1110) includes the knowledge engine to format the user interface activity action into a user interface trace. More specifically, at step (1110), the user interface trace creates and invokes an affirmative instruction of a physical action on the computer platform that has a strong or strongest congruence to the pattern identified in the corpus. The instruction is transmitted to the operating system to identify an application associated with the user interface trace(s) (1112) and to execute the user interface trace(s) that defines the activity within the identified application (1114). The application identification can be any application operatively coupled to the operating system. If the identified application is in an inactive state, the identification at step (1112) may include activation of the identified application. Similarly, if the identified application is un-installed, the operating system may recommend installation of the identified application. Once the application is installed or in an active state, the user interface trace(s) at step (1114) produces a physical action in the identified application. In one embodiment, the physical action is produced following receipt of the verbal phrase. Accordingly, the operating system is leveraged together with the corpus to execute a user interface trace with an appropriately defined application.

Figure 12:
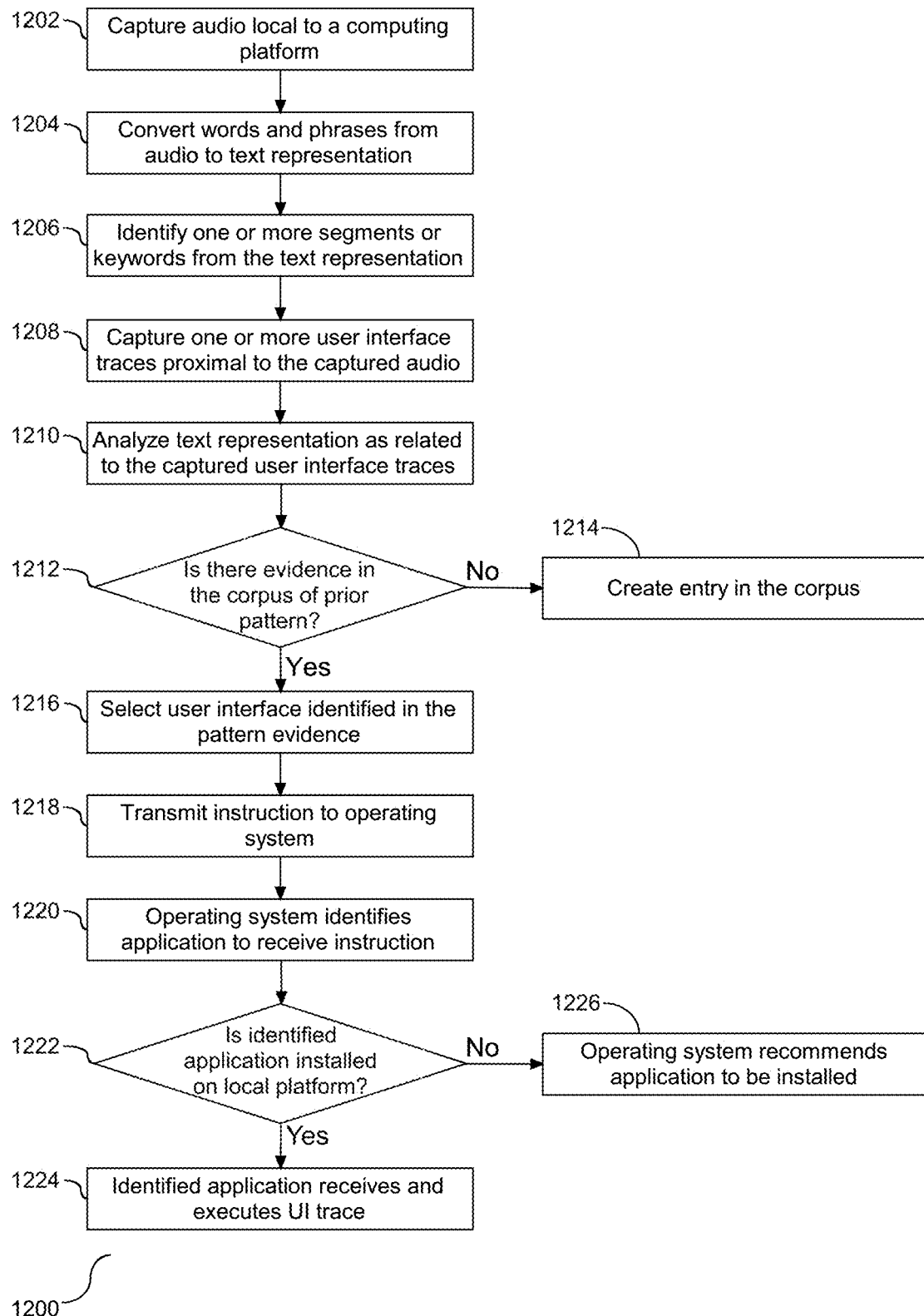
FIG. 12 depicts a flowchart illustrating a process for audio and/or captured user interface traces on an inter-application basis.

As shown in FIGS. 3-11, a corpus of text representation of received audio is built and maintained with respect to user interface traces and an associated application. Data within the corpus is shown to be processed to ascertain the intended functionality, and in one embodiment to crowdsource the associated text representation. Referring to FIG. 12, a flow chart (1200) is provided illustrating a process for audio and/or captured user interface traces on an inter-application basis. More specifically, the intent may be directed to a single application, such as an active application, or an application that is active at such time as the audio is captured. As shown, audio local to a computing platform is captured (1202) and associated words and phrases are converted into a text representation (1204). One or more segments or keywords from the text representation are identified (1206). In addition, one or more physical interactions in the form of user interface traces with an application of the computing platform that are proximal in time to the captured audio are captured (1208). The text representation as related to the captured user interface traces with the application is analyzed (1210). This analysis includes identification of any correlation between the text representation associated with the captured audio and the captured user interface traces. Accordingly, both audio and user interface traces associated with a computing platform are gathered and processed.

Following step (1210), a corpus is leveraged to ascertain any evidence of a previously pattern with the identified correlation (1212). If there is no evidence present in the corpus, an entry is created in the corpus that includes the text representation, any identified segments or keywords, captured user interface trace(s), and the identified active application (1214). However, if there is evidence present in the corpus, a user interface activity identified in the pattern evidence is selected (1216). More specifically, the pattern evidence at step (1216) identifies and invokes an affirmative computer-related instruction to invoke a physical action with a strongest congruence to the pattern. This instruction is transmitted to the operating system of the computer platform (1218). It is understood that the instruction may correspond to the previously identified application. However, by leveraging the operating system, a second application may be selected and to receive the instruction. Following step (1218), the application to receive the instruction is identified by the operating system (1220). It is then determined if the identified application is installed on the local computing platform (1222). A positive response to the determination at step (1222) is followed by the identified application receiving and then executing a user interface trace to invoke the instruction for the identified and selected application (1224). However, a negative response to the determination at step (1222) is followed by the operating system recommending installation of the identified application (1226). In one embodiment, the user interface trace for the application is invoked following installation of the identified application. Accordingly, the operating system is leveraged to identify and select an application to receive the instruction(s).

As shown and described in FIG. 12, the corpus is consulted for evidence of a pattern, which includes identification of an application to receive an associated instruction. It is understood that the identified application is coupled to the operating system of the associated computing platform. In one embodiment, different applications are utilized to invoke different functions and/or outcomes. As such, it is understood that the instruction identified in the corpus is directed at an associated functionality, and that the knowledge engine may need to be leveraged to format the underlying user interface activity of the associated instruction for the identified application.

Figure 13:
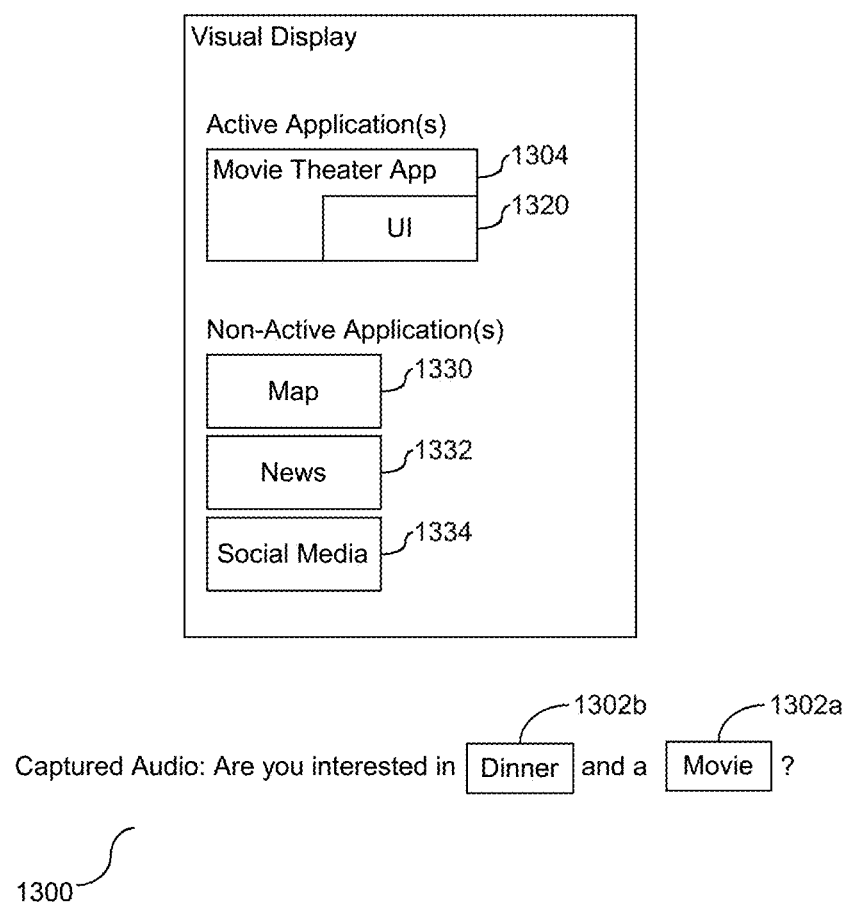
FIG. 13 depicts a block diagram to demonstrate an example of user interface trace selection as demonstrated on an intra-application environment.

Referring to FIG. 13, a block diagram (1300) is provided to demonstrate an example of user interface trace selection as demonstrated on an intra-application environment. Verbal content is received and converted into text. In this example, a mobile telecommunication device in the form of a 'smartphone' is the local platform. The identified keywords from the captured verbal content are 'movie' (1302a) and dinner (1302b). It is also determined that the active application (1304) is a movie theater selection application, in this case showing movies at several local theaters and their respective show times. The platform is shown with a plurality of other applications, including a mapping application (1330), a news application (1332), and a social media application (1334). For the identified keywords and the active movie application (1304) a corresponding user interface trace (1320) is detected in this application. In this example, the trace (1320) includes a menu selection in the movie application (1304) and activation of the mapping application (1330). Access to the knowledge base (160) shows previous actions associated with the movie application (1316) and verbal segments or keywords including "movie" and "food", and it is determined that related action include eating. Since the platform does not include a dining application for food establishments, the operating system suggests a dining application for the platform.

As disclosed herein, the linguistic analysis processing may be performed by a natural language processing system, such as the information handling system (152) as shown in FIG. 1, or any suitable information handling system. In one embodiment, a sentence parsing tool, such as but not limited to SGL, is applied to break the text representation of the received audio into constituent parts to find the sentence parts and location sequence, and to identify a segment or keyword within the representation.

As shown and described in FIGS. 8-12, the machine learning process presents the identified keyword(s) to the corpus to search for evidence of the pattern, and also presents any associated user interface traces to the corpus for evidence.

Embodiments may be in the form of a system with an intelligent computer platform for deciphering analogical phrases. A processing unit is operatively coupled to memory and is in communication with an artificial intelligence platform. A tool or detection engine (154), also in communication with the processing unit, is employed to decipher a phrase and identify any segment or keywords therein upon activation by the artificial intelligence platform. The procedure of deciphering the phrase utilizes a natural language processing tool.

The tool (154) continues by searching a corpus for evidence of a pattern associated with the identified key-word(s), such as congruence of corpus evidence with the identified keyword(s), and generating an outcome in the form of an instruction to invoke a user interface trace. The generated outcome identified in the corpus has a strong congruence to the identified segment(s) or keyword(s), and in one embodiment the underlying application.

Alternatively, the tool (154) may identify a first application associated with the captured audio and user interface trace(s), and through the corpus a user interface trace to be executed with a second application may be identified and invoked. Upon identifying the second application, the tool (154) leverages the operating system for identification of the second application, installation of the second application, if uninstalled, and translation of any associated user interface traces across the application platforms.

As shown and described, the corpus may be populated by the tool (154) with one or more segments or keywords and user interface traces associated with the received audio content. Also, the tool (154) may further adjust the outcome, the adjustment including searching the corpus of evidence. The tool (154) completes the task of assessing the received audio by converting the audio into a text representation and leveraging a natural language processing tool for identification of one or more keywords in the text representation. The tool (154) utilizes the corpus for evidence of a pattern associated with the set of outcomes, and at the same time adds entries to the corpus for future patterns of evidence.

Embodiments may also be in the form of a computer program device for use with an intelligent computer platform in order to assist the intelligent computer platform to evaluate text representation of audio. The device has program code embodied therewith. The program code is executable by a processing unit to parse the text representation, and identify any keywords therein. The parsing may be performed in accordance to SGL or any other form of natural language processing As shown and described, in one embodiment, the processing unit supports functionality to search the corpus, for evidence of a pattern associated with the set of outcomes, scores each entry in the outcome set according to a weighted calculation based on congruence with the pattern, and selects an entry from the outcome set based on the scoring. Each entry in the outcome set is scored by applying a weight to each entry, the weight based on an incidence of direct and indirect matches in the corpus. The outcome may be adjusted by searching the corpus of evidence. The processing unit completes the program coded task by converting the selected entry into an executable user interface trace.

It will be appreciated that there is disclosed herein a system, method, apparatus, and computer program product for evaluating natural language input, detecting one or more segments therein and associated user interfaces invoked in a corresponding computer platform, and matching a detected pattern or congruence to a definition. As disclosed, the system, method, apparatus, and computer program product apply natural language processing to an information source to identify a pattern in the input with one or more user interface traces and one or more applications.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a machine learning model based on pattern dissection of analogies and their meanings to determine outcomes, including an extended characteristic of key items in the analogical patterns.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments of the invention have been described herein for purposes of illustration, various modifications may be made without departing from the spirit and scope of the invention. In particular, the natural language processing may be carried out by different computing platforms or across multiple devices. Furthermore, the data storage and/or corpus may be localized, remote, or spread across multiple systems. Accordingly, the scope of protection of this invention is limited only by the following claims and their equivalents.

What is claimed is:

1. A computer system comprising:
   a processing unit operatively coupled to memory;
   an artificial intelligence platform, in communication with the processing unit;
   a knowledge engine in communication with the processing unit to employ an artificial intelligence platform, including:
   receive audio data from an audio stream over a communication channel;
   convert the received audio data into a text representation, including identify one or more segments in the representation;
   search a corpus for evidence of the converted text representation to identify evidence of a physical user interface traces with a select application;
   identify a select physical user interface trace in the corpus associated with the converted text representation, wherein the identification further comprises the knowledge engine to filter entries in the corpus and to identify a pattern of two or more user interface traces of the select application associated with the converted text representation, and identify a user interface activity correlated to the identified pattern; and generate an outcome from the identified select physical user interface trace, wherein the outcome is a computer program instruction to invoke the identified select physical user interface trace with the select application as a representation of the received audio data.

2. The system of claim 1, further comprising the knowledge engine to capture the user interface trace associated with the select application and commensurate with the received audio text, and populate the corpus with the converted text representation and the captured user interface trace.

3. The system of claim 2, wherein the knowledge engine filters the audio stream, including limit population of the corpus to audio data with an identified physical user interface trace.

4. The system of claim 3, further comprising the knowledge engine to create a new audio data intent to invoke a user interface trace correlated with the identified user interface activity.

5. The system of claim 1, further comprising the knowledge engine to aggregate a plurality of converted text entries and the user interface traces within the corpus to identify a pattern.

6. The system of claim 5, further comprising the knowledge engine to collapse a plurality of user interface traces into a single state, wherein dissimilar inputs produce an identical trace.

7. The system of claim 1, further comprising the knowledge engine to populate the corpus with the text converted from the captured audio data and the user interface trace defined in the invoked user interface activity, including submit the converted text and user interface trace into the corpus.

8. The system of claim 1, further comprising the knowledge engine to crowdsource the audio stream, including the knowledge engine to passively monitor the audio stream and correlate the received audio data with the identified physical action across multiple users of the select application.

9. A computer program product to convert verbal content into a physical action, the computer program product comprising a computer readable storage device having program code embodied therewith, the program code executable by a processing unit to:
receive audio data from an audio stream over a communication channel;
convert the received audio data into a text representation, including identify one or more segments in the representation;
search a corpus for evidence of the converted text representation to identify evidence of a physical user interface trace with a select application;
identify a select physical user interface trace in the corpus associated with the converted text representation, wherein the identification further comprises program code to filter entries in the corpus and to identify a pattern of two or more user interface traces of the select application associated with the converted text representation, and identify a user interface activity correlated to the identified pattern; and generate an outcome from the identified select physical user interface trace, wherein the outcome is a computer program instruction to invoke the identified select physical user interface trace with the select application as a representation of the received audio data.

10. The computer program product of claim 9, further comprising program code to capture the user interface trace associated with the select application and commensurate with the received audio data, and populate the corpus with the converted text representation and the captured user interface trace.

11. The computer program product of claim 10, wherein the program code filters the audio data, including limit population of the corpus to audio data with an identified physical user interface trace.

12. The computer program product of claim 11, further comprising program code to create a new audio data intent to invoke a user interface trace correlated with the identified user interface activity.

13. The computer program product of claim 9, further comprising program code to aggregate a plurality of converted text entries and the user interface traces within the corpus to identify a pattern.

14. The computer program product of claim 13, further comprising program code to collapse a plurality of user interface traces into a single state, wherein dissimilar inputs produce an identical trace.

15. A method to decipher a verbal phrase upon activation by the artificial intelligence platform comprising:
receiving audio data from an audio stream over a communication channel;
converting the received audio data into a text representation, including identifying one or more segments in the representation;
searching a corpus for evidence of the converted text representation to identify evidence of a physical user interface trace with a select application;
identifying a select physical user interface trace in the corpus associated with the converted text representation, wherein identifying the select physical user interface trace further comprises: filtering entries in the corpus and identifying a pattern of two or more user interface traces of the select application associated with the converted text representation; and identifying a user interface activity correlated to the identified pattern; and
generating an outcome from the identified select physical user interface trace, wherein the outcome is a computer program instruction to invoke the identified select physical user interface trace with the select application as a representation of the received audio data.

16. The method of claim 15, further comprising capturing the user interface trace associated with the select application and commensurate with the received audio text, and populating the corpus with the converted text representation and the captured user interface trace.

17. The method of claim 15, further comprising populating the corpus with the text converted from the captured audio data and the user interface trace defined in the invoked user interface activity, including submitting the converted text and user interface trace into the corpus.

* * * * *